United States Patent
Chang et al.

(10) Patent No.: US 10,964,317 B2
(45) Date of Patent: Mar. 30, 2021

(54) VOICE WAKEUP METHOD, APPARATUS AND SYSTEM, CLOUD SERVER AND READABLE MEDIUM

(71) Applicant: BAIDU ONLINE NETWORK TECHNOLOGY (BEIJING) CO., LTD., Beijing (CN)

(72) Inventors: Xiantang Chang, Beijing (CN); Lifeng Zhao, Beijing (CN); Rongjie Chen, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 88 days.

(21) Appl. No.: 15/857,582

(22) Filed: Dec. 28, 2017

(65) Prior Publication Data

US 2019/0013021 A1   Jan. 10, 2019

(30) Foreign Application Priority Data

Jul. 5, 2017 (CN) .......................... 201710543572.8

(51) Int. Cl.
*G10L 15/22* (2006.01)
*G06F 40/30* (2020.01)
(Continued)

(52) U.S. Cl.
CPC .............. *G10L 15/22* (2013.01); *G06F 3/167* (2013.01); *G06F 40/30* (2020.01); *G10L 15/222* (2013.01);
(Continued)

(58) Field of Classification Search
CPC . G10L 15/22; G10L 15/222; G10L 2015/088; G10L 2015/223; G06F 3/167; G06F 17/2785
See application file for complete search history.

(56) References Cited

U.S. PATENT DOCUMENTS 8,041,012 B2   10/2011   Reece et al.
8,154,227 B1 *  4/2012   Young ................... A63H 30/04
                                                    318/255
(Continued)

FOREIGN PATENT DOCUMENTS

CN      102682771 A      9/2012
CN      103456306 A      12/2013
(Continued)

OTHER PUBLICATIONS

Extended European Search Report from EP app. No. 18163308.2, dated Jan. 28, 2019.
(Continued)

*Primary Examiner* — Fariba Sirjani
(74) *Attorney, Agent, or Firm* — Ladas & Parry, LLP

(57) ABSTRACT

The present disclosure provides a voice wakeup method, apparatus and system, a cloud server and a readable medium. The method comprises: receiving a first request input by the user in a voice manner after a smart device enters a voice recognition phase; judging whether the first request after semantic parsing is consistent with pre-stored wakeup words; determining that the received first request is used to re-wake up the smart device if the first request is consistent with the pre-stored wakeup words. According to the above technical solutions, after the smart device enters the voice recognition phase, if the received first request is the wakeup words, the smart device does not perform service satisfaction processing for the first request. Capability of recognizing that the first request is re-wakeup does not cause a command recognition error and thereby can satisfy the user's expectation. The voice wakeup solution according to the present disclosure can effectively process the user's request and thereby can effectively improve the user's experience in use.

18 Claims, 7 Drawing Sheets

(51) Int. Cl.
*G06F 3/16* (2006.01)
*G10L 15/08* (2006.01)

(52) U.S. Cl.
CPC .. *G10L 2015/088* (2013.01); *G10L 2015/223* (2013.01)

(56) References Cited

U.S. PATENT DOCUMENTS

| | | | |
|---|---|---|---|
| 8,886,545 B2 | 11/2014 | Meisel et al. | |
| 8,938,394 B1* | 1/2015 | Faaborg | G06F 3/167 704/275 |
| 9,373,321 B2 | 6/2016 | Bapat et al. | |
| 10,057,125 B1* | 8/2018 | Roman | H04W 8/005 |
| 10,163,438 B2* | 12/2018 | Clark | G10L 25/84 |
| 10,304,465 B2* | 5/2019 | Gunn | G06F 3/0488 |
| 2003/0004721 A1* | 1/2003 | Zhou | G10L 15/083 704/251 |
| 2006/0077174 A1* | 4/2006 | Chung | H04N 5/4403 345/156 |
| 2008/0147652 A1* | 6/2008 | Kirkpatrick | G06F 40/226 |
| 2010/0169291 A1* | 7/2010 | Boyle | G06F 9/453 707/705 |
| 2011/0054899 A1 | 3/2011 | Phillips et al. | |
| 2012/0059652 A1 | 3/2012 | Adams et al. | |
| 2013/0072080 A1* | 3/2013 | Garbos | A63H 33/38 446/26 |
| 2014/0006825 A1* | 1/2014 | Shenhav | G06F 1/3206 713/323 |
| 2014/0074483 A1* | 3/2014 | van Os | G10L 15/22 704/275 |
| 2014/0195247 A1* | 7/2014 | Parkinson | G10L 21/06 704/275 |
| 2014/0201639 A1* | 7/2014 | Savolainen | G10L 17/26 715/727 |
| 2014/0297288 A1* | 10/2014 | Yu | H04M 1/72519 704/275 |
| 2014/0372115 A1* | 12/2014 | LeBeau | H04M 1/72552 704/235 |
| 2015/0039316 A1* | 2/2015 | Tzirkel-Hancock | G06F 3/167 704/275 |
| 2015/0081279 A1* | 3/2015 | Suleman | G06N 20/00 704/9 |
| 2015/0142438 A1* | 5/2015 | Dai | G10L 17/02 704/246 |
| 2015/0154953 A1* | 6/2015 | Bapat | G10L 15/06 704/251 |
| 2015/0302847 A1* | 10/2015 | Yun | G10L 15/02 704/251 |
| 2015/0303847 A1* | 10/2015 | McElveen | H02K 17/165 318/400.41 |
| 2016/0055847 A1* | 2/2016 | Dahan | G10L 15/30 704/275 |
| 2016/0093304 A1* | 3/2016 | Kim | G10L 15/26 704/235 |
| 2016/0098991 A1* | 4/2016 | Luo | G10L 15/22 455/563 |
| 2016/0140962 A1* | 5/2016 | Sharifi | G10L 15/08 704/275 |
| 2016/0155443 A1* | 6/2016 | Khan | G10L 15/22 704/275 |
| 2016/0180844 A1* | 6/2016 | VanBlon | G06F 3/167 704/275 |
| 2016/0267913 A1* | 9/2016 | Kim | G10L 15/22 |
| 2017/0154629 A1* | 6/2017 | Lu | G10L 15/22 |
| 2017/0162198 A1* | 6/2017 | Chakladar | G10L 15/22 |
| 2017/0169817 A1* | 6/2017 | VanBlon | G10L 15/02 |
| 2018/0074785 A1* | 3/2018 | Ohmura | G06F 3/167 |
| 2018/0108343 A1* | 4/2018 | Stevans | G10L 13/00 |
| 2018/0336894 A1* | 11/2018 | Graham | G06F 16/635 |
| 2019/0043510 A1* | 2/2019 | Wang | G10L 15/285 |
| 2019/0139545 A1* | 5/2019 | Yuan | G10L 15/08 |
| 2019/0189019 A1* | 6/2019 | Hammersley | G09B 5/062 |

FOREIGN PATENT DOCUMENTS

| | | |
|---|---|---|
| CN | 103714815 A | 4/2014 |
| CN | 103956168 A | 7/2014 |
| CN | 104183237 A | 12/2014 |
| CN | 104769668 A | 7/2015 |
| CN | 204440902 U | 7/2015 |
| CN | 104978965 A | 10/2015 |
| CN | 105895103 A | 8/2016 |
| CN | 105931644 A | 9/2016 |
| CN | 105976813 A | 9/2016 |
| CN | 106448664 A | 2/2017 |
| CN | 106611597 A | 5/2017 |
| CN | 107230475 A | 10/2017 |
| CN | 107358954 A | 11/2017 |
| CN | 107564517 A | 1/2018 |
| CN | 107610702 A | 1/2018 |
| CN | 107622770 A | 1/2018 |
| CN | 107704275 A | 2/2018 |
| EP | 2784774 A1 | 1/2014 |
| JP | 2000089789 A | 3/2000 |
| JP | 2004032087 A | 1/2004 |
| JP | 2004096520 A | 3/2004 |
| JP | 2016532146 A | 10/2016 |
| WO | 2014017144 A1 | 1/2014 |
| WO | 2014020588 A1 | 2/2014 |

OTHER PUBLICATIONS

Notification of Reason for Refusal from KR app. No. 2018-0030250, dated Mar. 15, 2019, with English translation from Global Dossier.
Communication pursuant to Article 94(3) EPC from EP app. No. 18163308.2, dated Apr. 2, 2020.
Communication under Rules 70(2) and 70a(2) EPC from EP app No. 18163308.2, dated Mar. 4, 2019.
Communication under Rule 70b(1) EPC from EP app. No. 18212729.0 dated Dec. 4, 2019.
Extended European Search Report from EP app. No. 18212729.0 dated Feb. 1, 2019.
Invitation under Rule 70b(1) EPC from EP app. No. 18163308.2 dated Sep. 6, 2019.
Decision to Grant a Patent from JP app. No. 2018-047997, dated May 28, 2020 with English translation from Global Dossier.
Notice of Reasons for Refusal from JP app. No. 2018-047997, dated Jan. 8, 2009 with English translation from Global Dossier.
Notice of Reasons for Refusal from JP app. No. 2018-047997, dated Oct. 1, 2019 with English translation from Global Dossier.
Notice of Allowance from KR app. No. 2018-0030250, dated Mar. 19, 2020, with English translation from Global Dossier.
Notification of Reason for Refusal from KR app. No. 2018-0030250, dated Sep. 25, 2019, with English translation from Global Dossier.
First office action and search report from CN app. No. 201710525422.4, dated Sep. 30, 2019, with English translation from Global Dossier.
Notification to Grant Patent Right for Invention from CN app. No. 201710525422.4, dated May 13, 2020, with English translation from Global Dossier.
First Office Action and search report from CN app. No. 201710543572.8, dated Mar. 5, 2020, with English translation from Global Dossier.
Second Office Action from CN app. No. 201710543572.8, dated Oct. 13, 2020, with English translation from Global Dossier.

* cited by examiner

VOICE WAKEUP METHOD, APPARATUS AND SYSTEM, CLOUD SERVER AND READABLE MEDIUM

CROSS REFERENCE TO RELATED APPLICATION

The present application claims priority to Chinese Patent Application No. 2017105435728, filed on Jul. 5, 2017, with the title of "Voice wakeup method, apparatus and system, cloud server and readable medium", the disclosure of which is hereby incorporated herein by reference in its entirety.

FIELD OF THE DISCLOSURE

The present disclosure relates to the technical field of computer application, and particularly to a voice wakeup method, a smart device, a server, a device and a readable medium.

BACKGROUND OF THE DISCLOSURE

As science and technology develops, many known smart devices support a user's voice input to enable the user to use the smart device more conveniently.

If a smart device is online for a long time period, this causes larger power consumption and shorter service life of the smart device. Therefore, the known smart device may be in a sleep state when not in use to save power consumption. When the user needs to use the smart device, he may wake up the smart device through wakeup words. Then the smart device gets into a voice recognition state. In this state, the smart device receives a user-input request in the form of voice, implements recognition of the user's voice and analysis of semantics in cooperation with a cloud server, and satisfies service requested by the user. In the prior art, when the user wakes up the smart device, if the wakeup words are input through voice at least twice, the wakeup words of the first time may be recognized as being used to wake up the smart device, and subsequent wakeup words are recognized as input of the voice request, whereupon the smart device inquires the user-requested service according to the wakeup words in cooperation with the cloud server.

Therefore, according to the voice wakeup solution in the prior art, if the wakeup words are input at least twice upon wakeup, the latter wakeup words are mistaken as the user's voice request, which causes command recognition errors and cannot satisfy the user's expectation.

SUMMARY OF THE DISCLOSURE

The present disclosure provides a voice wakeup method, a smart device, a server, a device and a readable medium, to improve accuracy of command recognition and satisfy the user's expectation.

The present disclosure provides a voice wakeup method, comprising:

receiving a first request input by the user in a voice manner after a smart device enters a voice recognition phase;

judging whether the first request after semantic parsing is consistent with pre-stored wakeup words;

determining that the received first request is used to re-wake up the smart device if the first request is consistent with the pre-stored wakeup words.

Further optionally, in the method, before receiving the first request input by the user in a voice manner after the smart device enters the voice recognition phase, the method further comprises:

receiving a second request input by the user in a voice manner;

according to the second request, querying in a local service information library to find service corresponding to the second request, and beginning to perform service satisfaction processing corresponding to the second request;

furthermore, after determining that the received first request is used to re-wake up the smart device, the method further comprises:

stopping service satisfaction processing corresponding to the second request.

Further optionally, in the method, before receiving the first request input by the user in a voice manner after the smart device enters the voice recognition phase, the method further comprises:

receiving the second request input by the user in a voice manner;

sending a smart device identifier and the second request to the cloud server to enable the cloud server to begin to implement the service satisfaction processing corresponding to the second request on the smart device;

furthermore, after determining that the received first request is used to re-wake up the smart device, the method further comprises:

sending the cloud server a re-wakeup notification message carrying the identifier of the smart device so that the cloud server, according to the identifier of the smart device, determines a corresponding smart device re-wakeup; and stopping service satisfaction processing corresponding to the second request; or sending the identifier of the smart device and the first request to the cloud server so that the cloud server obtains the pre-stored wakeup words of the smart device according to the identifier of the smart device, and judging whether the first request after semantic parsing is consistent with the pre-stored wakeup words; if they are consistent, determining that the received first request is used to re-wake up the smart device, and stopping service satisfaction processing corresponding to the second request.

Further optionally, in the method, after receiving the second request input by the user in a voice manner and before sending the cloud server the second request carrying the identifier of the smart device, the method further comprises:

failing to find service corresponding to the second request by querying a local service information library of the smart device.

Further optionally, in the method, after sending the smart device identifier and the second request to the cloud server, the method further comprises:

obtaining a time difference between current time and time of sending the second request to the cloud server;

displaying the time difference to the user until cancelling the display when a feedback about the service corresponding to the second request sent by the cloud server is received;

receiving the wakeup words input by the user through voice to re-wake up the smart device; the wakeup words are sent by the user upon determining that the time difference is larger than a preset time length according to the displayed time difference;

or, after sending the smart device identifier and the second request to the cloud server, the method further comprises:

detecting whether service feedback from the cloud server is received within a preset time length after the second request is sent;

displaying a prompt message of re-wakeup to the user if the service feedback from the cloud server is not received within the preset time length;

receiving the wakeup words input by the user through voice to re-wake up the smart device.

The present disclosure further provides a voice wakeup method, comprising:

after a smart device enters a voice recognition phase, receiving an identifier of the smart device and a first request sent by the smart device, wherein the first request is input by the user and received by the smart device;

obtaining pre-stored wakeup words of the smart device according to the identifier of the smart device;

judging whether the first request after semantic parsing is consistent with the pre-stored wakeup words;

determining that the received first request is used to re-wake up the smart device if the first request after semantic parsing is consistent with the pre-stored wakeup words.

Further optionally, before receiving the identifier of the smart device and the first request sent by the smart device, the method further comprises:

receiving an identifier of the smart device and a second request sent by the smart device, wherein the second request is input by the user and received by the smart device;

beginning to perform service satisfaction processing corresponding to the second request on the smart device;

after determining that the received first request is used to re-wake up the smart device, the method further comprises:

stopping service satisfaction processing corresponding to the second request.

The present disclosure provides a smart device, comprising:

a receiving module configured to receive a first request input by the user in a voice manner after the smart device enters a voice recognition phase;

a judging module configured to judge whether the first request after semantic parsing is consistent with pre-stored wakeup words;

a determining module configured to determine that the received first request is used to re-wake up the smart device if the first request is consistent with the pre-stored wakeup words.

Further optionally, the smart device further comprises a service satisfaction processing module:

the receiving module is further configured to receive a second request input by the user in a voice manner;

the service satisfaction processing module is configured to, according to the second request, query in a local service information library to find service corresponding to the second request, and begin to perform service satisfaction processing corresponding to the second request;

furthermore, the service satisfaction processing module is further configured to stop service satisfaction processing corresponding to the second request.

Further optionally, the smart device further comprises a sending module;

the receiving module is further configured to receive the second request input by the user in a voice manner;

the sending module is configured to send a smart device identifier and the second request to the cloud server to enable the cloud server to begin to implement the service satisfaction processing corresponding to the second request on the smart device;

furthermore, the sending module is further configured to send the cloud server a re-wakeup notification message carrying the identifier of the smart device so that the cloud server, according to the identifier of the smart device, determines a corresponding smart device re-wakeup; and stop service satisfaction processing corresponding to the second request;

or the sending module is further configured to send the identifier of the smart device and the first request to the cloud server so that the cloud server obtains the pre-stored wakeup words of the smart device according to the identifier of the smart device, and judge whether the first request after semantic parsing is consistent with the pre-stored wakeup words; if they are consistent, determine that the received first request is used to re-wake up the smart device, and stop service satisfaction processing corresponding to the second request.

Further optionally, in the aforesaid smart device, the service satisfaction processing module is further configured to fail to find service corresponding to the second request by querying a local service information library of the smart device.

Further optionally, the smart device further comprises an obtaining module and a displaying module;

the obtaining module is configured to obtain a time difference between current time and time of sending the second request to the cloud server;

the displaying module is configured to display the time difference to the user until cancelling the display when a feedback about the service corresponding to the second request sent by the cloud server is received;

the receiving module is further configured to receive the wakeup words input by the user through voice to re-wake up the smart device; the wakeup words are sent by the user upon determining that the time difference is larger than a preset time length according to the displayed time difference;

or, the smart device further comprises a detecting module:

the detecting module is configured to detect whether service feedback from the cloud server is received within a preset time length after the second request is sent;

the displaying module is further configured to display a prompt message of re-wakeup to the user if the detecting module detects the service feedback from the cloud server is not received within the preset time length after the second request is sent;

the receiving module is further configured to receive the wakeup words input by the user through voice to re-wake up the smart device.

The present disclosure further provides a cloud server, comprising:

a receiving module configured to, after a smart device enters a voice recognition phase, receive an identifier of the smart device and a first request sent by the smart device, wherein the first request is input by the user and received by the smart device;

an obtaining module configured to obtain pre-stored wakeup words of the smart device according to the identifier of the smart device;

a judging module configured to judge whether the first request after semantic parsing is consistent with the pre-stored wakeup words;

a determining module configured to determine that the received first request is used to re-wake up the smart device if the judging module judges the first request after semantic parsing is consistent with the pre-stored wakeup words.

Further optionally, the cloud server further comprises a service satisfaction processing module:

the receiving module is further configured to receive an identifier of the smart device and a second request sent by the smart device, wherein the second request is input by the user and received by the smart device;

the service satisfaction processing module is configured to begin to perform service satisfaction processing corresponding to the second request on the smart device;

furthermore, the service satisfaction processing module is configured to stop service satisfaction processing corresponding to the second request.

The present disclosure further provides a voice wakeup system, comprising a smart device and the cloud server; the smart device is communicatively connected with the cloud server; the smart device employs the aforesaid smart device, and the cloud server employs the aforesaid cloud server.

The present disclosure further provides a smart device, comprising:

one or more processors;

a memory for storing one or more programs;

when said one or more programs are executed by said one or more processors, said one or more processors are enabled to implement the aforesaid voice wakeup method.

The present disclosure further provides a cloud server, comprising:

one or more processors;

a memory for storing one or more programs;

when said one or more programs are executed by said one or more processors, said one or more processors are enabled to implement the aforesaid voice wakeup method.

The present disclosure provides a computer-readable medium on which a computer program is stored, the program, when executed by the processor, implementing the aforesaid voice wakeup method.

The present disclosure provides the voice wakeup method, the smart device, the server, the device and the readable medium. According to the above technical solutions, after the smart device enters the voice recognition phase, if the received first request is the wakeup words, the smart device does not perform service satisfaction processing for the first request. Capability of recognizing that the first request is re-wakeup does not cause a command recognition error and thereby can satisfy the user's expectation. The voice wakeup solution according to the present embodiment can effectively process the user's request and thereby can effectively improve the user's experience in use.

DETAILED DESCRIPTION OF PREFERRED EMBODIMENTS

The present disclosure will be described in detail in conjunction with figures and specific embodiments to make objectives, technical solutions and advantages of the present disclosure more apparent.

Figure 1:
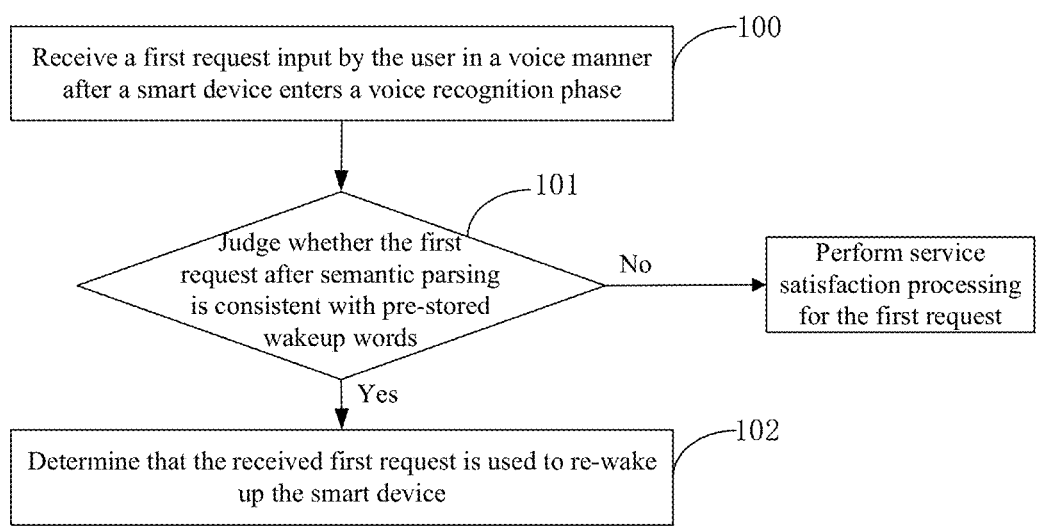
FIG. 1 is a flow chart of a first embodiment of a voice wakeup method according to the present disclosure.

FIG. 1 is a flow chart of a first embodiment of a voice wakeup method according to the present disclosure. As shown in FIG. 1, the voice wakeup method according to the present embodiment may specifically comprise the following steps:

100: receiving a first request input by the user in a voice manner after a smart device enters a voice recognition phase.

A subject for executing the voice wakeup method according to the present embodiment is a smart device, for example, the smart device according to the present embodiment may be a mobile phone, a tablet computer or other hardware devices installed with Android Operating System OS, an OS of IOS or an embedded OS of Linux.

In use, the smart device according to the present embodiment may support voice input. To reduce power consumption, the smart device according to the present embodiment may be in a standby state when it is not used in a long time period. Then, the user may input wakeup words for the smart device to wake up the smart device. Then, the smart device enters the voice recognition phase.

For example, a time threshold may be preset. If the smart device fails to receive any voice input within a time length of the preset time threshold, the smart device enters the standby state. Specifically, the preset time threshold may be stored in the smart device, and the smart device itself detects whether any voice input is not received from the user within the time length of the preset time threshold, and enters the standby state if yes.

Alternatively, the preset time threshold may be stored by a cloud server that is in remote wireless communication with the smart device. When the smart device operates, it only receives the user's voice request, then sends the user's voice request to the cloud server and the cloud server processes the voice request. It is assumed that the smart device is not confronted with faults and the network operates normally, if the cloud server does not receive any voice input sent by the smart device within the time length of the preset time threshold, it may be determined that the user does not send any voice input to the smart device within the time length of the preset time threshold. At this time, the cloud server may send the smart device an instruction message to enter a sleep state, and then the smart device lowers power consumption and enters the sleep phase according to the received instruction message.

After entering the voice recognition phase and after receiving the user's voice request, the smart device may process the user's voice request by itself, or process the user's voice request in cooperation with the cloud server. The processing procedure may include: voice recognition, semantic parsing and service satisfaction. That is to say, it is possible to recognize the user-input voice into words information, and then perform sematic parsing to the recognized words information, to analyze the user's intention, namely, the user's request; finally, determine service corresponding to the user's request, and satisfy the user's service. The smart device can be liberated completely. Like the above-mentioned manner, the smart device, after receiving the user's voice request, directly sends the voice request to the cloud server, and the cloud server performs processing such as voice recognition, semantic parsing and service satisfaction. Alternatively, if the smart device has a certain processing capability, it stores certain service information library, wherein voice recognition, semantic parsing and service satisfaction all may be performed in the smart device. However, this imposes higher requirements for the smart device. It is also possible that only the smart device performs semantic recognition and semantic parsing, and then the cloud server performs service satisfaction processing. The service satisfaction processing according to the present embodiment is a processing procedure of providing the user with service that satisfies the request. For example, the request is "open the camera", or query about "today's gold price" or "today's exchange rate".

In the present embodiment, an example is given in which the smart device can perform voice recognition and semantic parsing. Furthermore, service satisfaction may be performed on the side of the smart device or on the side of the cloud server. After having received the wakeup words and entering the voice recognition phase, the smart device receives the first request input by the user in a voice manner. Then, the smart device further performs voice recognition and sematic parsing for the first request, and, after the parsing, obtains words form corresponding to the first request. For example, if the first request input by the user in a voice manner may be the wakeup words of the smart device, the corresponding first request after the voice recognition and sematic parsing is wakeup words in the form of words.

101: judging whether the first request after semantic parsing is consistent with pre-stored wakeup words; if they are consistent, perform step 102; otherwise, perform service satisfaction processing for the first request;

102: determining that the received first request is used to re-wake up the smart device.

In the present embodiment, it is feasible to compare the first request after the sematic parsing with the pre-stored wakeup words, and judge whether the first request after the sematic parsing is consistent with the pre-stored wakeup words, and determine the first request is used to re-wake up the smart device if they are consistent, or otherwise, continue to perform service satisfaction processing for the first request.

Optionally, if all first requests received by the smart device are respectively compared with the pre-stored wakeup words in practical application, this inevitably makes the processing efficiency lower. Hence, it is possible to first obtain the number of words of the first request after the sematic parsing, and if the number of words is equal to the number of the pre-stored wakeup words, compare the first request after the sematic parsing with the pre-stored wakeup words and judge whether the two are consistent or not, which may improve the processing efficiency.

According to the voice wakeup method according to the present embodiment, upon entering the voice recognition phase, the smart device receives the first request input by the user in the voice manner; judges whether the first request after the sematic parsing is consistent with the pre-stored wakeup words; and determines that the wakeup words are used to re-wake up the smart device if they are consistent. According to the technical solution of the present embodiment, after the smart device enters the voice recognition phase, if the received first request is the wakeup words, the smart device does not perform service satisfaction processing for the first request. Capability of recognizing that the first request is re-wakeup does not cause a command recognition error and thereby can satisfy the user's expectation. The voice wakeup solution according to the present embodiment can effectively process the user's request and thereby can effectively improve the user's experience in use.

Optionally, before step 100 "receiving a first request input by the user in a voice manner after a smart device enters a voice recognition phase" of the embodiment shown in above FIG. 1, the method may further comprise: receiving a second request input by the user in a voice manner; and according to the second request, querying in a local service information library to find service corresponding to the second request, and beginning to perform service satisfaction processing corresponding to the second request.

After entering the voice recognition phase, the smart device may process the user's voice request. For example, the smart device may receive the second request input by the user in a voice manner. Then, the smart device may perform voice recognition and sematic parsing for the second request, and determine that the number of words of the second request is not equal to the number of words of the wakeup words. Then, the smart device may begin to perform service satisfaction processing for the second request. Specifically, the smart device may query a local service information library of the smart device for the service corresponding to the second request, and provide the user with the service. For example, the user inputs "help me to make a telephone call for XXX" through voice, whereupon after performing voice recognition and semantic parsing for the request, the smart device may query the service information library for a manner of invoking service corresponding to "help me to make a telephone call for XXX", and then invoke the service for the user, namely, directly query contacts for the telephone number of XXX and dial the telephone number. The service information library on the side of the smart device may include information of all services that can be implemented on the side of the smart device, and include a service name such as "call", and a service implementation manner and the like.

At this time, correspondingly, after the step 102 "determining that the received wakeup words are used to re-wake up the smart device", the method may further comprise: stopping service satisfaction processing corresponding to the second request.

That is to say, after sending the second request, the user sends the wakeup words to the smart device. At this time, the smart device determines that the user needs to re-wake up the smart device, and service satisfaction processing not implemented previously all stops, for example, stop querying a manner of implementing the service corresponding to the second request if the query is being performed; immediately stop providing the user with the service corresponding to the second request if the service corresponding to the second request is being provided.

Optionally, if, in the present embodiment, when the smart device does not perform voice recognition and semantic parsing for the first request and second request and directly sends the first request and second request to the cloud server, due to Voice Activity Detection (VAD) the first request must be sent after a subscribed time threshold after the second request is sent, which may ensure the cloud server receives the second request, and the first request is sent at this time. The subscribed time threshold may be selected according to actual experience.

The above embodiment presents an example in which the smart device handles voice recognition, semantic analysis and service satisfaction. Optionally, the service satisfaction processing may be implemented by the cloud server. Specifically, before step 100 "receiving a first request input by the user in a voice manner after a smart device enters a voice recognition phase", the method may further comprise: receiving a second request input by the user in a voice manner; sending a smart device identifier and the second request to the cloud server to enable the cloud server to begin to implement the service satisfaction processing corresponding to the second request on the smart device.

Likewise, the smart device may directly send the second request to the cloud server, and may, after performing voice recognition and sematic parsing for the second request, send words information after semantic parsing of the second request to the cloud server. That is to say, the service satisfaction in the present embodiment is implemented on the side of the cloud server, and voice recognition and semantic analysis may be implemented on the side of the smart device; certainly, in practical application, voice recognition and semantic analysis may also be implemented on the side of the cloud server.

Furthermore, after step 102 "determining that the received first request is used to re-wake up the smart device", the method may further comprise: sending the cloud server a re-wakeup notification message carrying an identifier of the smart device so that the cloud server, according to the identifier of the smart device, determines the corresponding smart device re-wakeup; and stopping service satisfaction processing corresponding to the second request.

In this manner, the smart device performs voice recognition and semantic parsing, and the cloud server implements service satisfaction processing. After receiving the first request, the smart device performs preliminary judgment and determines that the user needs to re-wake up the smart device, whereupon the smart device may directly send the cloud server a re-wakeup notification message carrying an identifier of the smart device. As such, the cloud server determines the corresponding smart device re-wakeup according to the received smart device identifier; stops service satisfaction processing corresponding to the second request, for example, including stopping query for service corresponding to the second request, or stopping providing the user with service corresponding to the second request via the smart device.

Alternatively, after step 102 "determining that the received first request is used to re-wake up the smart device", the method may further comprise: sending the identifier of the smart device and the first request to the cloud server so that the cloud server obtains the pre-stored wakeup words of the smart device according to the identifier of the smart device, and judges whether the first request after semantic parsing is consistent with the pre-stored wakeup words; if they are consistent, determining that the received first request is used to re-wake up the smart device, and stopping service satisfaction processing corresponding to the second request, for example, including stopping query for service corresponding to the second request, or stopping providing the user with service corresponding to the second request via the smart device.

This manner is different from the above manner in that the smart device may not send a self-detection result to the cloud server, but directly send the identifier of the smart device and the first request to the cloud server so that the cloud server obtains the pre-stored wakeup words of the smart device according to the identifier of the smart device, and judges whether the first request after semantic parsing is consistent with the pre-stored wakeup words; if they are consistent, determining that the received first request is used to re-wake up the smart device, and stopping service satisfaction processing corresponding to the second request.

Optionally, in practical application, both the smart device and the cloud server may implement service satisfaction, the smart device may be used to implement satisfaction of some simple offline services that can be implemented locally, and the cloud server is used to implement satisfaction of some complicated online services that can be implement by virtue of network. At this time, optionally after the step "receiving a second request input by the user in a voice manner" and before the step "sending the identifier of the smart device and the second request to the cloud server" in the above embodiment, the method may further comprise: failing to find service corresponding to the second request by querying the local service information library of the smart device. The local service information library of the smart device only records names of services that can be implemented locally, for example, if the user wants to query for today's stock market index, the smart device cannot achieve this locally, whereupon names of services about "today's stock market" are not stored in the local service information library. At this time, when the smart device cannot locally achieve satisfaction of the service corresponding to the second request, the smart device sends the second request to the cloud server so that the cloud server achieves satisfaction of the service corresponding to the second request. For example, it is possible to achieve some offline services at the locality of the smart device, for example, make a telephone call, or open a certain application. It is feasible to achieve some online services at the cloud server, for example, today's stock market trend, today's weather, today's exchange rate or the like.

Further optionally, on the basis of the technical solution of the above embodiment, after "sending the identifier of the smart device and the second request to the cloud server", the method may include the following step: obtaining a time difference between current time and time of sending the second request to the cloud server; displaying the time difference to the user until cancelling the display when a feedback about the service corresponding to the second request sent by the cloud server is received; receiving the wakeup words input by the user through voice to re-wake up the smart device; the wakeup words are sent by the user upon determining that the time difference is larger than a preset time length according to the displayed time difference.

In this implementation mode, since the user determines to re-wake up the smart device, he cancels the previous request. Specifically, after the smart device sends a request to the cloud server each time, it is feasible to activate a time keeper to keep time for the time difference between the current time and the time of sending the second request to the cloud server, and meanwhile display the time difference to the user on a display screen of the smart device. As such, the user may know how long the request has already been sent. If the smart device receives the service corresponding to the request fed back by the cloud server, the display of the time keeper on the display screen of the smart device may be cancelled at this time. If the time difference displayed by the time keeper is larger than a preset time length, for example 60s, any service feedback is not received from the cloud server, and the display of the smart device further displays a gradually-increasing time difference, whereupon the user may cancel the previous request and re-wake up the smart device. Specifically, the user may input wakeup words to the smart device through voice, implement re-wakeup of the smart device by independently operating or cooperating with the cloud server, and cancel service satisfaction processing with regards to the request before re-wakeup.

Alternatively, on the basis of the technical solution of the above embodiment, after "sending the identifier of the smart device and the second request to the cloud server", the method may further include the following step: detecting whether service feedback from the cloud server is received within a preset time length after the second request is sent; displaying a prompt message of re-wakeup to the user if the service feedback is not received; receiving the wakeup words input by the user through voice to re-wake up the smart device.

This implementation mode differs from the above implementation mode in that the user triggers the smart device to re-wake up in the above implementation mode whereas in this implementation mode, the smart device detects. If service feedback from the cloud server is not received within the preset time length after the second request is sent, the smart device prompts the user to re-wake up the smart device. Then, the user inputs the wakeup words through voice to re-wake up the smart device.

According to the voice wakeup method of the above embodiment, it is feasible to input wakeup words to the smart terminal to re-wake up if necessary; the wakeup words will not be mistaken as voice recognition so that the accuracy of command recognition may be ensured and the user's expectation be satisfied. Hence, the voice wakeup solution of the above embodiment can effectively process the user's request and thereby can effectively improve the user' experience in use.

Figure 2:
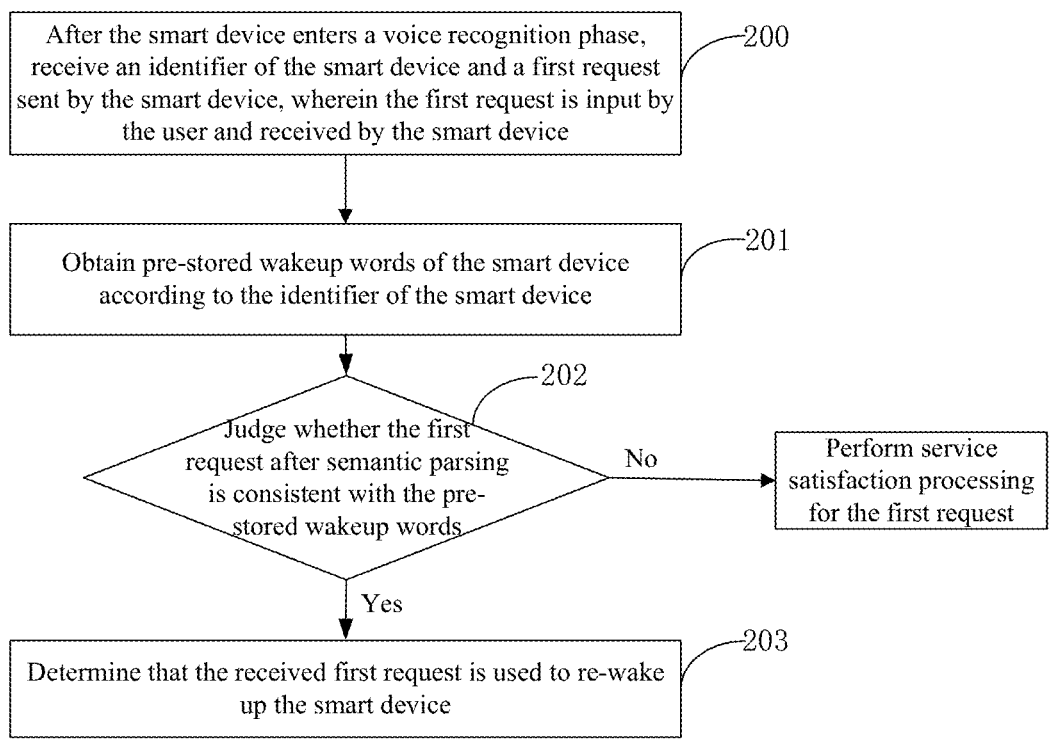
FIG. 2 is a flow chart of a second embodiment of a voice wakeup method according to the present disclosure.

FIG. 2 is a flow chart of a second embodiment of a voice wakeup method according to the present disclosure. As shown in FIG. 2, the voice wakeup method according to the present embodiment may specifically comprise the following steps:

200: after the smart device enters a voice recognition phase, receiving an identifier of the smart device and a first request sent by the smart device, wherein the first request is input by the user and received by the smart device;

201: obtaining pre-stored wakeup words of the smart device according to the identifier of the smart device;

202: judging whether the first request after semantic parsing is consistent with the pre-stored wakeup words; if yes, performing step 203; if no, performing service satisfaction processing for the first request;

203: determining that the received first request is used to re-wake up the smart device.

A subject for executing the voice wakeup method according to the present embodiment is a cloud server. In the present embodiment, the cloud server at least provides implementation of service satisfaction in the voice recognition phase. The voice recognition and semantic parsing may be implemented on the side of the smart device, or on the side of the cloud server. If they are implemented on the smart device, the first request received from the smart device in step 200 is the first request in the form of words after the smart device performs voice recognition and semantic parsing, whereupon the identifier of the smart device may be carried in the first request. If the voice recognition and semantic parsing are implemented on the side of the cloud server, the first request received from the smart device in step 200 is may be in a voice form, whereupon the voice recognition and semantic parsing may be performed for the first request in the voice form. On the side of the smart device, the received first request input by the user is in a voice form.

The cloud server of the present embodiment may support several smart devices, so each message sent by the smart device to the cloud server needs to carry the identifier of the smart device so that the cloud server determines which smart device sends the message. The wakeup words of each smart device is stored in the cloud server. After receiving the request message of a certain smart device, the cloud server may obtain the pre-stored wakeup words of the smart device according to the identifier of the smart device in the request message, then judge whether the first request after the semantic parsing is consistent with the pre-stored wakeup words; if yes, determine that the received first request is used to re-wake up the smart device; if no, continue to perform service satisfaction processing for the first request;

According to the voice wakeup method of the present embodiment, the principle of implementing the voice wakeup mechanism on the side of the cloud server is similar to the technical solution of the embodiment shown in FIG. 1. For details, please refer to the depictions of the embodiment shown in FIG. 1. No detailed depictions are presented any more here.

According to the voice wakeup method of the present embodiment, if the smart device enters the voice recognition phase, the cloud server may receive the identifier of the smart device and the first request sent by the smart device, wherein the first request is input by the user and received by the smart device; pre-stored wakeup words of the smart device are obtained according to the identifier of the smart device; judgement is performed as to whether the first request after semantic parsing is consistent with the pre-stored wakeup words; if yes, it is determined that the received first request is used to re-wake up the smart device. In the technical solution of the present embodiment, after the smart device enters the voice recognition phase, if the received request is wakeup words, service satisfaction processing will not be performed for the request. Capability of recognizing that the first request is re-wakeup does not cause a command recognition error and thereby can satisfy the user's expectation. The voice wakeup solution according to the present embodiment can effectively process the user's request and thereby can effectively improve the user's experience in use.

Furthermore optionally, before step 200 "receiving an identifier of the smart device and a first request sent by the smart device", the method may further comprise: receiving an identifier of the smart device and a second request sent by the smart device, wherein the second request is input by the user and received by the smart device; beginning to perform service satisfaction processing corresponding to the second request on the smart device.

After step 203 "determining that the received first request is used to re-wake up the smart device", the method may further comprise: stopping service satisfaction processing corresponding to the second request, for example, including stopping query for service corresponding to the second request, or stopping providing the user with service corresponding to the second request via the smart device.

Reference may be made to the technical solution regarding the side of the smart device for a specific implementation mode of the above steps. No detailed depictions are presented any more here. It is clear from the above depictions that the voice wakeup method of the present disclosure may be implemented individually on the side of the smart device or may be implemented on the side of the smart device and the side of the cloud server in cooperation. The technical solution of the present disclosure will be described below by taking both sides in cooperation as an example.

Figure 3:
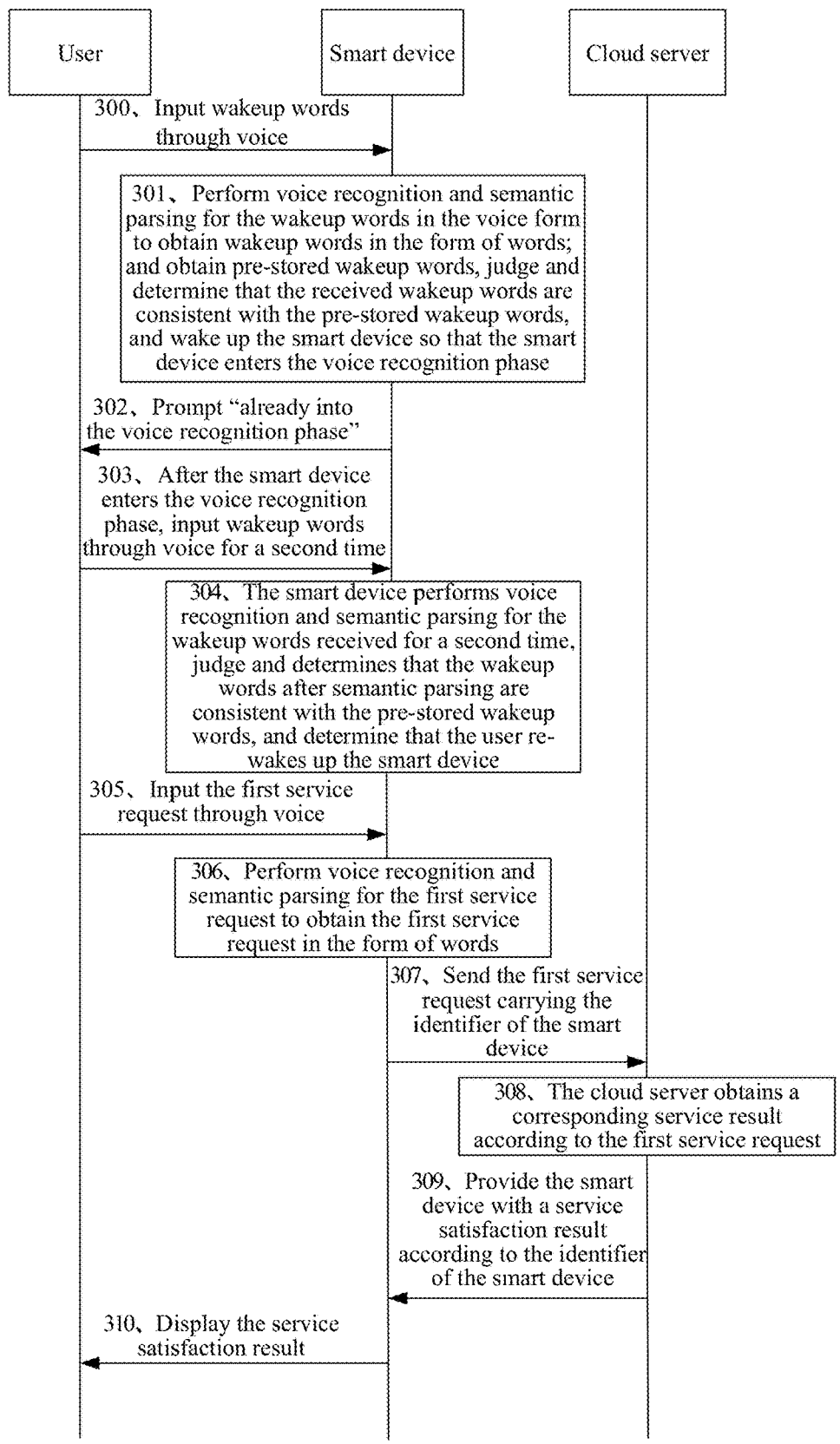
FIG. 3 is a signaling diagram of a third embodiment of a voice wakeup method according to the present disclosure.

FIG. 3 is a signaling diagram of a third embodiment of a voice wakeup method according to the present disclosure. As shown in FIG. 3, the voice wakeup method according to the present embodiment may specifically include the following steps:

300: when the smart device is in a standby state, the user inputs wakeup words to the smart device;

301: the smart device performs voice recognition and semantic parsing for the wakeup words in the voice form to obtain wakeup words in the form of words; and obtains pre-stored wakeup words, judges and determines that the received wakeup words are consistent with the pre-stored wakeup words, and wakes up the smart device so that the smart device enters the voice recognition phase;

In the present embodiment, an indication of wakeup of the smart device is that a display screen lights up.

302: the smart device prompts "already into the voice recognition phase" to the user through the display screen;

303: after the smart device enters the voice recognition phase, the user inputs wakeup words through voice to the smart device for a second time;

304: the smart device performs voice recognition and semantic parsing for the wakeup words received for a second time, judges and determines that the wakeup words after semantic parsing are consistent with the pre-stored wakeup words, and determines that the user re-wakes up the smart device;

That is to say, it is determined that the user still wakes up the smart device, and the wakeup words of the second time do not undergo voice recognition as a command of voice recognition.

305: after the smart device enters the voice recognition phase, the user inputs the first service request to the smart device through voice;

306: the smart device performs voice recognition and semantic parsing for the first service request to obtain the first service request in the form of words;

307: the smart device sends the first service request carrying the identifier of the smart device to the cloud server;

308: the cloud server obtains a corresponding service result according to the first service request;

For example, if the user sends the first service request of "what about today's weather?" through the smart device, the cloud server may be connected with the Internet.

309: the cloud server provides the smart device with a service satisfaction result according to the identifier of the smart device;

310: the smart device displays the service satisfaction result to the user.

The present embodiment presents an example in which voice recognition and semantic parsing are performed on the side of the smart device, and service satisfaction is implemented by the cloud server. Optionally, in the above embodiment, the smart device may not perform any processing and may be liberated completely. The smart device may only directly send all received wakeup words or request in the voice form to the cloud server, and the cloud server performs voice recognition, semantic parsing and service satisfaction processing. No detailed depictions are presented any more here.

According to the voice wakeup method of the present embodiment, by using the above technical solution, after the smart device enters the voice recognition phase, if the wakeup words are received again, service satisfaction processing will not be performed for the wakeup words. Capability of recognizing that the wakeup words are used to instruct the smart device to re-wake up does not cause a command recognition error and thereby can satisfy the user's expectation. The voice wakeup solution according to the present embodiment can effectively process the user's request and thereby can effectively improve the user's experience in use.

Figure 4:
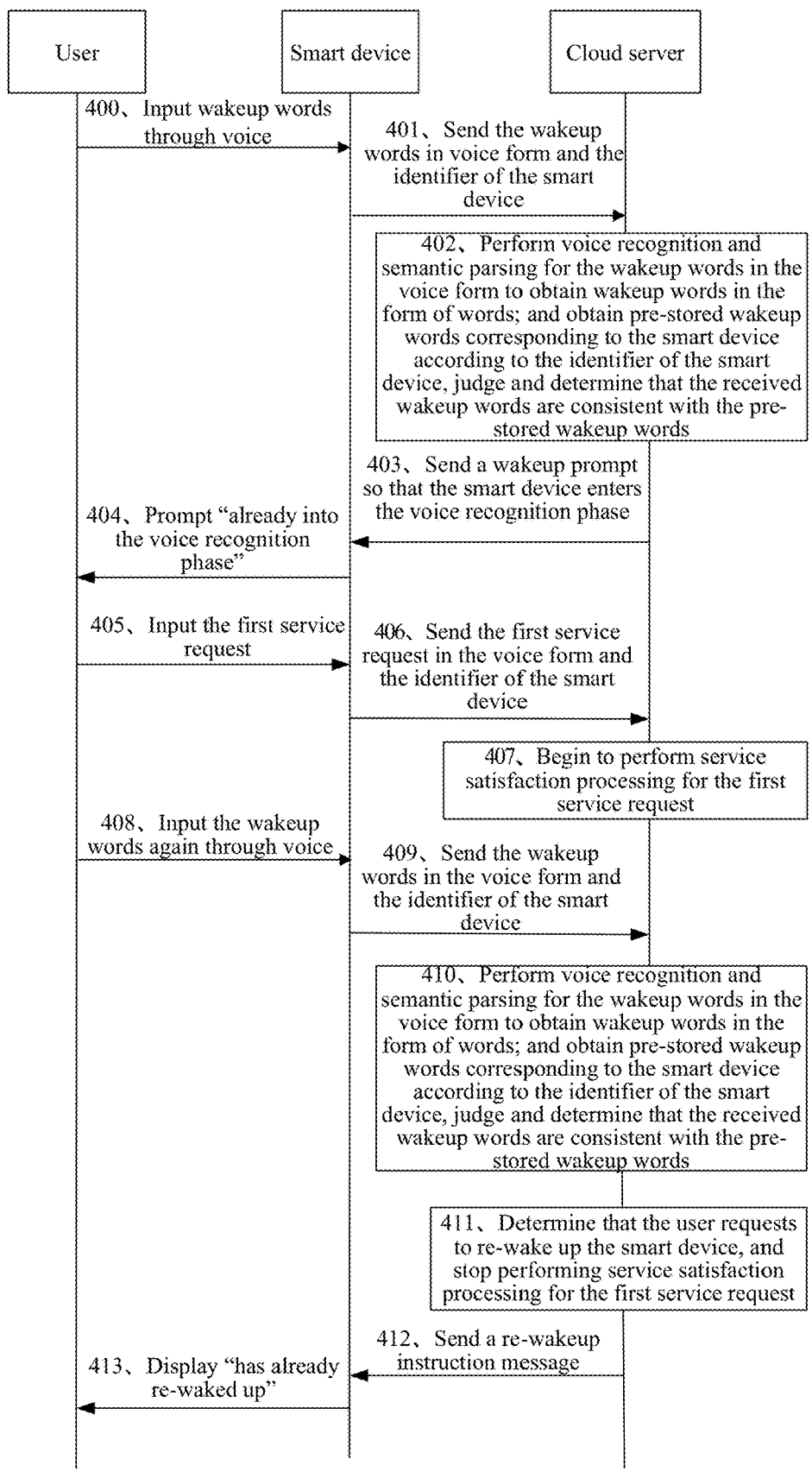
FIG. 4 is a signaling diagram of a fourth embodiment of a voice wakeup method according to the present disclosure.

FIG. 4 is a signaling diagram of a fourth embodiment of a voice wakeup method according to the present disclosure. As shown in FIG. 4, the voice wakeup method according to the present embodiment may specifically include the following steps:

400: when the smart device is in a standby state, the user inputs wakeup words to the smart device;

401: the smart device sends the wakeup words in voice form and the identifier of the smart device to the cloud server;

402: the smart device performs voice recognition and semantic parsing for the wakeup words in the voice form to obtain wakeup words in the form of words; and obtains pre-stored wakeup words corresponding to the smart device according to the identifier of the smart device, judges and determines that the received wakeup words are consistent with the pre-stored wakeup words;

403: the smart device sends a wakeup prompt to the smart device so that the smart device enters the voice recognition phase;

404: the smart device displays "already into the voice recognition phase" to the user through the display screen;

Optionally, according to the above step 400, the user may input the wakeup words again; it may be determined according to the processing in steps 401-404 that the user re-wakes up the smart device and the wakeup words cannot be considered as other voice commands.

405: after the smart device enters the voice recognition phase, the user inputs the first service request to the smart device;

406: the smart device sends the first service request in the voice form and the identifier of the smart device to the cloud server;

407: the cloud server begins to perform service satisfaction processing for the first service request;

408: the user inputs the wakeup words again to the smart device;

409: the smart device sends the wakeup words in the voice form and the identifier of the smart device to the cloud server;

410: the cloud server performs voice recognition and semantic parsing for the wakeup words in the voice form to obtain wakeup words in the form of words; and obtains pre-stored wakeup words corresponding to the smart device according to the identifier of the smart device, judges and determines that the received wakeup words are consistent with the pre-stored wakeup words;

411: the cloud server determines that the user requests to re-wake up the smart device, and stops performing service satisfaction processing for the first service request;

412: the cloud server sends a re-wakeup instruction message to the smart device;

413: the smart device displays "has already re-waked up" to the user.

In the present embodiment, the smart device does not perform any processing and is liberated completely. The smart device may only directly send all received wakeup words or request in the voice form to the cloud server, and the cloud server performs voice recognition, semantic parsing and service satisfaction processing. Optionally, it is also possible that the smart device performs voice recognition and semantic parsing, whereas the cloud server only performs service satisfaction processing. This is not detailed any more here.

According to the voice wakeup method of the present embodiment, by using the above technical solution, after the smart device enters the voice recognition phase, if wake-up words are received again after the service satisfaction processing begins to be performed for the first service request, service satisfaction processing will not be performed for the wakeup words. Capability of recognizing that the wakeup words are used to instruct the smart device to re-wake up stops the previous service satisfaction processing, does not cause a command recognition error and thereby can satisfy the user's expectation. The voice wakeup solution according to the present embodiment can effectively process the user's request and thereby can effectively improve the user's experience in use.

Figure 5:
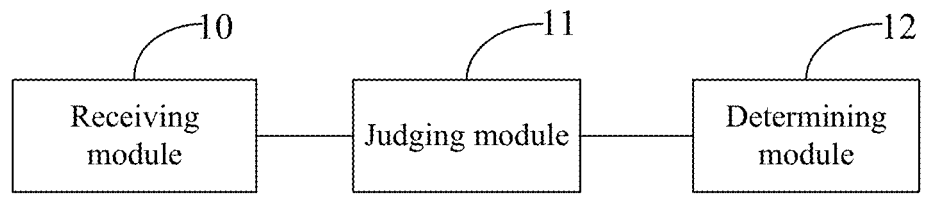
FIG. 5 is a structural diagram of a first embodiment of a smart device according to the present disclosure.

FIG. 5 is a structural diagram of a first embodiment of a smart device according to the present disclosure. As shown in FIG. 5, the smart device of the present embodiment may specifically comprise:

a receiving module 10 configured to receive a first request input by the user in a voice manner after a smart device enters a voice recognition phase;

a judging module 11 configured to judge whether the first request received by the receiving module 10 after semantic parsing is consistent with pre-stored wakeup words;

a determining module 12 configured to determine that the received first request is used to re-wake up the smart device if the judging module 11 judges that the first request is consistent with the pre-stored wakeup words.

Principles and technical effects of the smart device of the present embodiment implementing the voice wakeup processing using the above modules are identical with those in the above relevant method embodiment. Reference may be made to the depictions of the above relevant method embodiment for details. No detailed depictions are presented any more here.

Figure 6:
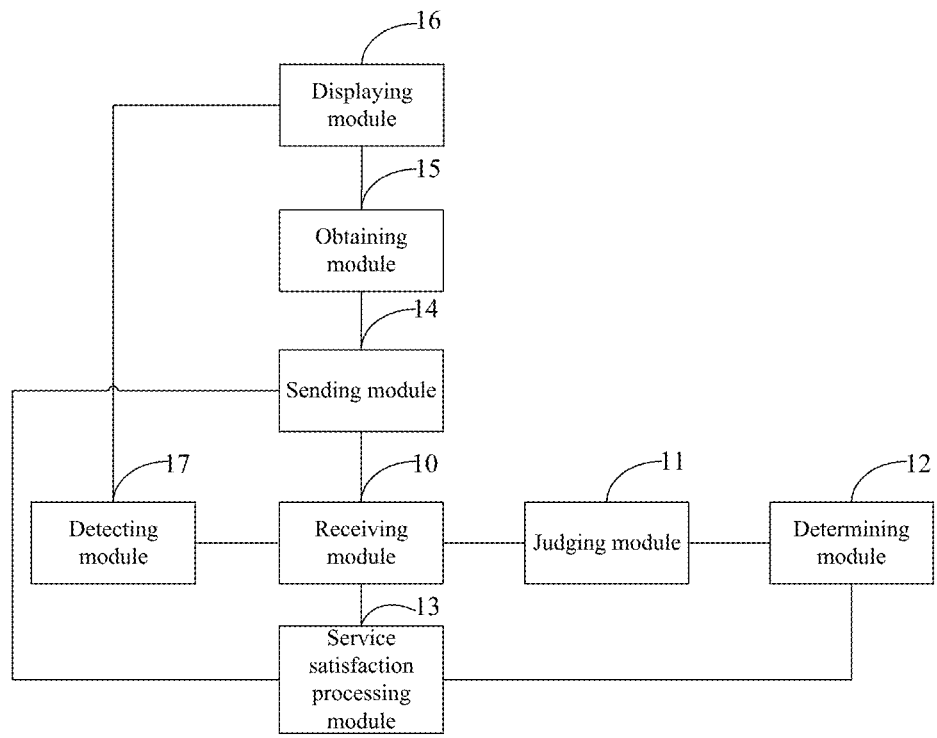
FIG. 6 is a structural diagram of a second embodiment of a smart device according to the present disclosure.

FIG. 6 is a structural diagram of a second embodiment of a smart device according to the present disclosure. As shown in FIG. 6, the smart device of the present embodiment, on the basis of the technical solution of the embodiment shown in FIG. 5, may further comprise the following technical solution.

As shown in FIG. 6, the smart device of the present embodiment further comprises a service satisfaction processing module 13.

Wherein the receiving module 10 is further configured to receive a second request input by the user in a voice manner;

The service satisfaction processing module 13 is configured to, according to the second request received by the receiving module 10, query in a local service information library to find service corresponding to the second request, and begin to perform service satisfaction processing corresponding to the second request.

Furthermore, the service satisfaction processing module 13 is further configured to stop service satisfaction processing corresponding to the second request when the determining module 12 determines that the received first request is used to re-wake up the smart device.

Further optionally, as shown in FIG. 6, the smart device in the present embodiment further comprises a sending module 14.

The receiving module 10 is further configured to receive a second request input by the user in a voice manner;

The sending module 14 is configured to send a smart device identifier and the second request received by the receiving module 10 to the cloud server to enable the cloud server to begin to implement the service satisfaction processing corresponding to the second request on the smart device;

Furthermore, the sending module 14 is further configured to send the cloud server a re-wakeup notification message carrying an identifier of the smart device so that the cloud server, according to the identifier of the smart device, determines the corresponding smart device re-wakeup; and stop service satisfaction processing corresponding to the second request;

Or the sending module 14 is further configured to send the identifier of the smart device and the first request received by the receiving module 10 to the cloud server so that the cloud server obtains pre-stored wakeup words of the smart device according to the identifier of the smart device, and judge whether the first request after semantic parsing is consistent with the pre-stored wakeup words; if they are consistent, determine that the received first request is used to re-wake up the smart device, and stop service satisfaction processing corresponding to the second request.

Further optionally, in the smart device of the present embodiment, the service satisfaction processing module 13 is further configured to fail to find service corresponding to the second request by querying a local service information library of the smart device. At this time, the sending module 14 is triggered to perform the above operations.

Further optionally, as shown in FIG. 6, the smart device of the present embodiment further comprises an obtaining module 15 and a displaying module 16;

the obtaining module 15 is configured to obtain a time difference between current time and time when the sending module 14 sends the second request to the cloud server;

the displaying module 16 is configured to display the time difference obtained by the obtaining module 15 to the user until cancelling the display when a feedback about the service corresponding to the second request sent by the cloud server is received;

the receiving module 10 is further configured to receive the wakeup words input by the user through voice to re-wake up the smart device; the wakeup words are sent by the user upon determining that the time difference is larger than a preset time length according to the displayed time difference;

or optionally, as shown in FIG. 6, the smart device of the present embodiment further comprises a detecting module 17:

the detecting module 17 is configured to detect whether service feedback from the cloud server is received within a preset time length after the sending module 14 sends the second request;

the displaying module 16 is further configured to display a prompt message of re-wakeup to the user if the detecting module 17 detects the service feedback from the cloud server is not received within a preset time length after the second request is sent;

the receiving module 10 is further configured to receive the wakeup words input by the user through voice to re-wake up the smart device.

The above modules included by the smart device of the present embodiment may be combined in any combinable manners to form optional embodiments of the present disclosure, which will not be described one by one.

Principles and technical effects of the smart device of the present embodiment implementing the voice wakeup processing using the above modules are identical with those in the above relevant method embodiment. Reference may be made to the depictions of the above relevant method embodiment for details. No detailed depictions are presented any more here.

Figure 7:
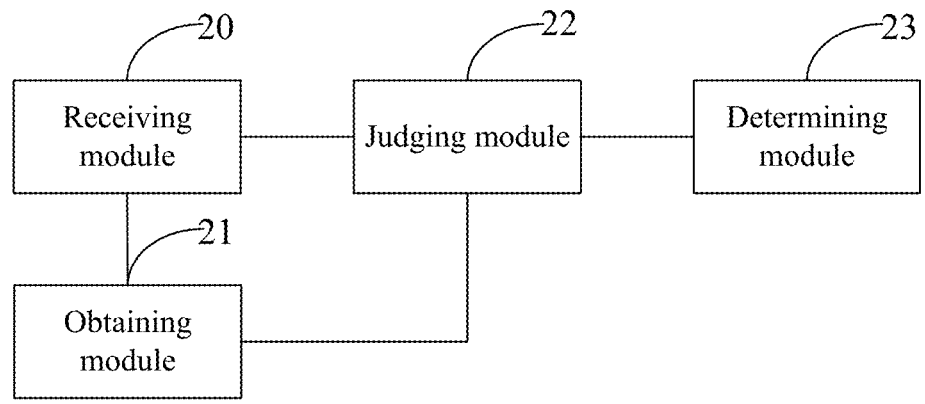
FIG. 7 is a structural diagram of a first embodiment of a cloud server according to the present disclosure.

FIG. 7 is a structural diagram of a first embodiment of a cloud server according to the present disclosure. As shown in FIG. 7, the cloud server of the present embodiment may specifically comprise:

a receiving module 20 configured to, after the smart device enters a voice recognition phase, receive an identifier of the smart device and a first request sent by the smart device, wherein the first request is input by the user and received by the smart device;

an obtaining module 21 configured to obtain pre-stored wakeup words of the smart device according to the identifier of the smart device received by the receiving module 20;

a judging module 22 configured to judge whether the first request received by the receiving module 20 after semantic parsing is consistent with the pre-stored wakeup words obtained by the obtaining module 21;

a determining module 23 configured to determine that the received first request is used to re-wake up the smart device if the judging module 22 judges the first request after semantic parsing is consistent with the pre-stored wakeup words.

Principles and technical effects of the cloud server of the present embodiment implementing the voice wakeup processing using the above modules are identical with those in the above relevant method embodiment. Reference may be made to the depictions of the above relevant method embodiment for details. No detailed depictions are presented any more here.

Figure 8:
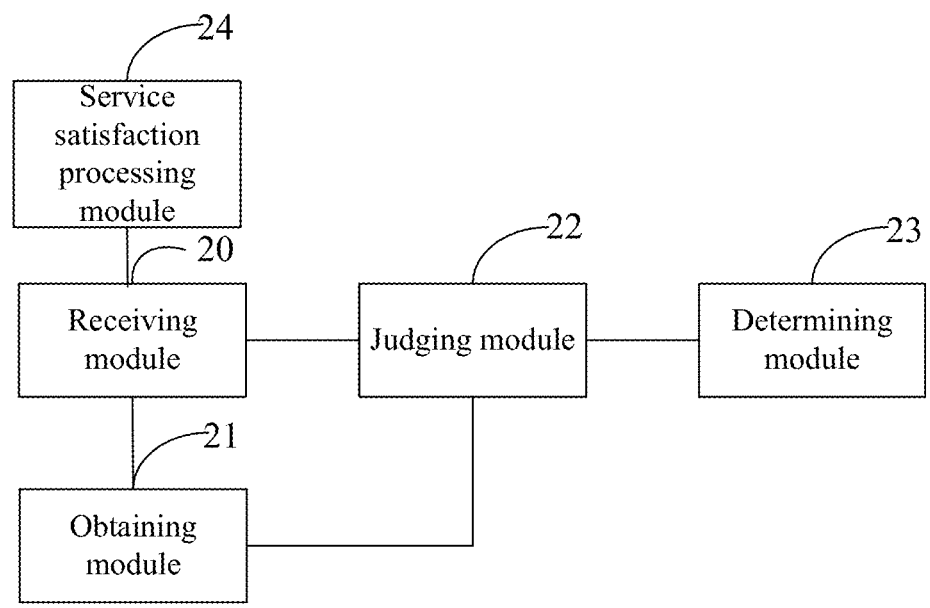
FIG. 8 is a structural diagram of a second embodiment of a cloud server according to the present disclosure.

FIG. 8 is a structural diagram of a second embodiment of a cloud server according to the present disclosure. As shown in FIG. 8, the cloud server of the present embodiment, on the basis of the technical solution of the embodiment shown in FIG. 7, may further specifically comprise the following technical solution.

As shown in FIG. 8, the cloud server of the present embodiment further comprises a service satisfaction processing module 24.

The receiving module 20 is further configured to receive an identifier of the smart device and a second request sent by the smart device, wherein the second request is input by the user and received by the smart device;

The service satisfaction processing module 24 is configured to begin to perform service satisfaction processing corresponding to the second request received by the receiving module 20 on the smart device;

Furthermore, the service satisfaction processing module 24 is configured to stop service satisfaction processing corresponding to the second request when the determining module 23 determines that the received first request is used to re-wake up the smart device.

Principles and technical effects of the cloud server of the present embodiment implementing the voice wakeup processing using the above modules are identical with those in the above relevant method embodiment. Reference may be made to the depictions of the above relevant method embodiment for details. No detailed depictions are presented any more here.

Figure 9:
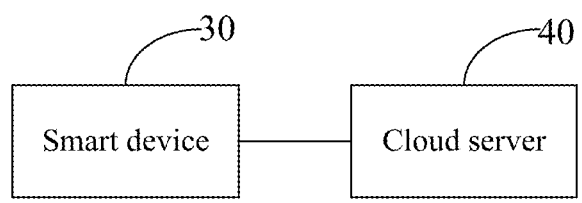
FIG. 9 is a structural diagram of an embodiment of a voice wakeup system according to the present disclosure.

FIG. 9 is a structural diagram of an embodiment of a voice wakeup system according to the present disclosure. As shown in FIG. 9, the voice wakeup system of the present embodiment comprises a smart device 30 and a cloud server 40.

The smart device 30 of the present embodiment may employ the above smart device which is stated in the embodiment shown in FIG. 6 and capable of interacting with the cloud server 40, and the cloud server 40 of the present embodiment may employ the cloud server of the embodiment shown in FIG. 7 or FIG. 8. And the voice wakeup method of the embodiment shown in FIG. 2, FIG. 3 or FIG. 4 may be employed specifically. Reference may be made to the above relevant embodiments for details. No detailed depictions are presented any more here.

Figure 10:
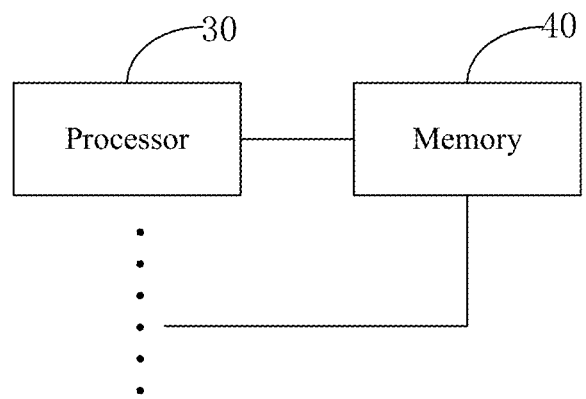
FIG. 10 is a structural diagram of an embodiment of a smart device according to the present disclosure.

FIG. 10 is a structural diagram of an embodiment of a smart device according to the present disclosure. As shown in FIG. 10, the smart device of the present embodiment comprises: one or more processors 30, a memory 40 for storing one or more programs; when one or more programs stored in the memory 40 are executed by said one or more processors 30, said one or more processors 30 are enabled to implement the voice wakeup method of the embodiment shown in FIG. 1. The embodiment shown in FIG. 10 take a plurality of processors 30 as an example.

Likewise, the cloud server of the present embodiment may also employ the structure shown in FIG. 10, including one or more processors 30 and a memory 40, wherein when one or more programs stored in the memory 40 are executed by said one or more processors 30, said one or more processors 30 are enabled to implement the voice wakeup method of the embodiment shown in FIG. 2.

Figure 11:
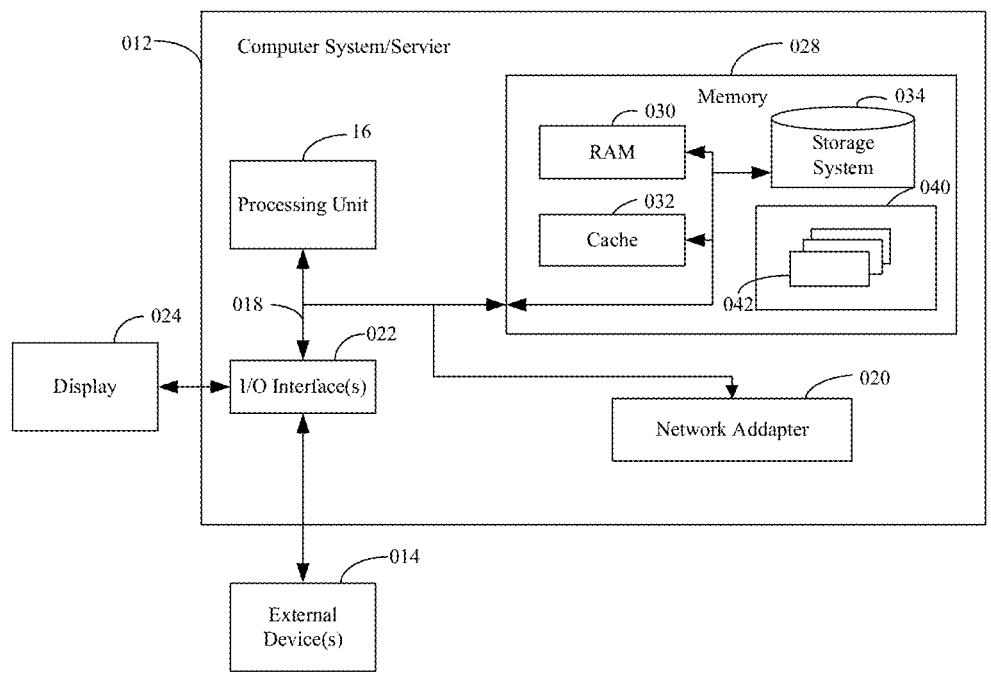
FIG. 11 is an exemplary diagram of a cloud server according to the present disclosure.

For example, FIG. 11 is an exemplary diagram of a cloud server according to the present disclosure. FIG. 11 illustrates a block diagram of an exemplary cloud server 12a adapted to implement an implementation mode of the present disclosure. The cloud server 12a shown in FIG. 11 is only an example and should not bring about any limitation to the function and scope of use of the embodiments of the present disclosure.

As shown in FIG. 11, the cloud server 12a is shown in the form of a general-purpose computing device. The components of cloud server 12a may include, but are not limited to, one or more processors 16, a system memory 28a, and a bus 18a that couples various system components including system memory 28a and the processors 16s.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Cloud server 12a typically includes a variety of computer system readable media. Such media may be any available media that is accessible by cloud server 12a, and it includes both volatile and non-volatile media, removable and non-removable media.

Memory 28a can include computer system readable media in the form of volatile memory, such as random access memory (RAM) 30a and/or cache memory 32a. Cloud server 12a may further include other removable/non-removable, volatile/non-volatile computer system storage media. By way of example only, storage system 34a can be provided for reading from and writing to a non-removable, non-volatile magnetic media (not shown in FIG. 11 and typically called a "hard drive"). Although not shown in FIG. 11, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The memory 28a may include at least one program product having a set (e.g., at least one) of program modules that are configured to carry out the functions of embodiments of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments of the present disclosure as shown in FIG. 1-FIG. 9.

Cloud server 12a may also communicate with one or more external devices 14a such as a keyboard, a pointing device, a display 24a, etc.; with one or more devices that enable a user to interact with cloud server 12a; and/or with any devices (e.g., network card, modem, etc.) that enable cloud server 12a to communicate with one or more other computing devices. Such communication can occur via Input/Output (I/O) interfaces 22a. Still yet, cloud server 12a can communicate with one or more networks such as a local area network (LAN), a general wide area network (WAN), and/or a public network (e.g., the Internet) via network adapter 20a. As depicted in in the figure, network adapter 20a communicates with the other communication modules of cloud server 12a via bus 18a. It should be understood that although not shown, other hardware and/or software modules could be used in conjunction with cloud server 12a. Examples, include, but are not limited to: microcode, device drivers, redundant processing units, external disk drive arrays, RAID systems, tape drives, and data archival storage systems, etc.

The processor 16a executes various function applications and data processing by running programs stored in the memory 28a, for example, implement the voice wakeup method shown in the above embodiments.

The present disclosure further provides a computer-readable storage medium on which a computer program is stored. The program, when executed by a processor, can implement the voice wakeup method in the embodiment shown in FIG. 1, or the voice wakeup method in the embodiment shown in FIG. 2.

The computer-readable medium of the present embodiment may comprise RAM 30a, and/or cache 32a, or/and a storage system 34a in the system memory 28a in the embodiment shown in FIG. 11.

Along with development of science and technology, propagation channels of computer programs are no longer limited to tangible medium, and the computer programs may be directly downloaded from network or obtained in other manners. Hence, the computer-readable media in the present embodiment may include tangible medium as well as intangible media.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A voice wakeup method, wherein the method comprises:
   receiving speech input consisting of one predefined wakeup phrase from a user, wherein the predefined wakeup phrase wakes up a smart device into a voice recognition phase;
   receiving a first request input by the user in a voice manner during the voice recognition phase after the smart device is woken up by the predefined wakeup phrase and has entered the voice recognition phase;
   performing voice recognition on the first request to obtain the first request in a text form;
   determining whether a number of words of the first request in the text form is equal to a number of words of the predefined wakeup phrase;
   if the number of words of the first request in the text form is equal to the number of words of the predefined wakeup phrase, then sending an identifier of the smart device and the first sequence in the text form to a cloud server so that the cloud server obtains the predefined wakeup phrase of the smart device according to the identifier of the smart device, and judges whether the first request in the text form consists of the predefined wakeup phrase;
   determining that the first request is used to re-wake up the smart device when the first request in the text form consists of the predefined wakeup phrase,
   wherein the method further comprises:
   before receiving the first request, receiving, during the voice recognition phase, a second request including a voice command from the user, and performing service satisfaction processing corresponding to the second request; and
   after determining that the received first request is used to re-wake up the smart device, stopping service satisfaction processing corresponding to the second request, to receive upcoming voice command.

2. The method according to claim 1, wherein performing service satisfaction processing corresponding to the second request comprises:
   querying in a local service information library to find service corresponding to the second request, and performing service satisfaction processing corresponding to the second request on the smart device.

3. The method according to claim 1, wherein performing service satisfaction processing corresponding to the second request comprises:
   sending the identifier of the smart device and the second request to the cloud server to enable the cloud server to begin to perform the service satisfaction processing corresponding to the second request on the smart device, and
   wherein after determining that the received first request is used to re-wake up the smart device, the method further comprises:
   sending the cloud server a re-wakeup notification message carrying the identifier of the smart device so that the cloud server, according to the identifier of the smart device, determines the corresponding smart device re-wakeup, and stopping service satisfaction processing corresponding to the second request.

4. The method according to claim 3, wherein after receiving the second request and before sending the cloud server the second request carrying the identifier of the smart device, the method further comprises:
   failing to find service corresponding to the second request by querying a local service information library of the smart device.

5. The method according to claim 3, wherein after sending the identifier of the smart device and the second request to the cloud server, the method further comprises:
   obtaining a time difference between current time and time of sending the second request to the cloud server;
   displaying the time difference to the user until a feedback about the service corresponding to the second request sent by the cloud server is received, and cancelling the display after the feedback is received;
   receiving the predefined wakeup phrase input by the user through voice to re-wake up the smart device; the predefined wakeup phrase are sent by the user upon determining that the time difference is larger than a preset time length according to the displayed time difference;
   or, after sending the identifier of the smart device and the second request to the cloud server, the method further comprises:
   detecting whether service feedback from the cloud server is received within a preset time length after the second request is sent;
   displaying a prompt message of re-wakeup to the user when the service feedback from the cloud server is not received within the preset time length;
   receiving the predefined wakeup phrase input by the user through voice to re-wake up the smart device.

6. A voice wakeup method, comprising:
   after a smart device is woken up by a predefined wakeup phrase and has entered a voice recognition phase,
   receiving an identifier of the smart device and a first request sent by the smart device during the voice recognition phase, wherein the first request is input by the user and received by the smart device;
   obtaining the predefined wakeup phrase of the smart device according to the identifier of the smart device;
   performing voice recognition on the first request to obtain the first request in a text form;
   determining whether a number of words of the first request in the text form is equal to a number of words of the predefined wakeup phrase;
   if the number of words of the first request in the text form is equal to the number of words of the predefined wakeup phrase, judging whether the first request in the text form consists of the predefined wakeup phrase;
   determining that the received first request is used to re-wake up the smart device when the first request in the text form consists of the predefined wakeup phrase;
   wherein the method further comprises:

before receiving the first request, during the voice recognition phase, receiving the identifier of the smart device and a second request including a voice command from the smart device, wherein the second request is input by the user and received by the smart device, and performing service satisfaction processing corresponding to the second request; and after determining that the received first request is used to re-wake up the smart device, stopping service satisfaction processing corresponding to the second request, to receive upcoming voice command.

7. A smart device, wherein the smart device comprises:
one or more processors;
a memory for storing one or more programs;
when said one or more programs are executed by said one or more processors, said one or more processors are enabled to implement a method comprising the following operations:
receiving speech input consisting of one predefined wakeup phrase from a user, wherein the predefined wakeup phrase wakes up a smart device into a voice recognition phase;
receiving a first request input by the user in a voice manner during the voice recognition phase after the smart device is woken up by the predefined wakeup phrase and has entered the voice recognition phase;
performing voice recognition on the first request to obtain the first request in a text form;
determining whether a number of words of the first request in the text form is equal to a number of words of the predefined wakeup phrase;
if the number of words of the first request in the text form is equal to the number of words of the predefined wakeup phrase, then sending an identifier of the smart device and the first sequence in the text form to a cloud server so that the cloud server obtains the predefined wakeup phrase of the smart device according to the identifier of the smart device, and judges whether the first request in the text form consists of the predefined wakeup phrase;
determining that the first request is used to re-wake up the smart device when the first request in the text form consists of the predefined wakeup phrase,
wherein the method further comprises:
before receiving the first request, receiving, during the voice recognition phase, a second request including a voice command from the user, and performing service satisfaction processing corresponding to the second request; and
after determining that the received first request is used to re-wake up the smart device, stopping service satisfaction processing corresponding to the second request, to receive upcoming voice command.

8. The smart device according to claim 7, wherein performing service satisfaction processing corresponding to the second request comprises:
querying in a local service information library to find service corresponding to the second request, and performing service satisfaction processing corresponding to the second request on the smart device.

9. The smart device according to claim 7, wherein performing service satisfaction processing corresponding to the second request comprises:
sending the identifier of the smart device and the second request to the cloud server to enable the cloud server to begin to perform the service satisfaction processing corresponding to the second request on the smart device, and wherein after determining that the received first request is used to re-wake up the smart device, the operation further comprises:
sending the cloud server a re-wakeup notification message carrying the identifier of the smart device so that the cloud server, according to the identifier of the smart device, determines the corresponding smart device re-wakeup, and stopping service satisfaction processing corresponding to the second request.

10. The smart device according to claim 9, wherein after receiving the second request and before sending the cloud server the second request carrying the identifier of the smart device, the method further comprises:
failing to find service corresponding to the second request by querying a local service information library of the smart device.

11. The smart device according to claim 9, wherein after sending the identifier of the smart device and the second request to the cloud server, the method further comprises:
obtaining a time difference between current time and time of sending the second request to the cloud server;
displaying the time difference to the user until a feedback about the service corresponding to the second request sent by the cloud server is received, and cancelling the display after the feedback is received;
receiving the predefined wakeup phrase input by the user through voice to re-wake up the smart device; the predefined wakeup phrase are sent by the user upon determining that the time difference is larger than a preset time length according to the displayed time difference;
or, after sending the identifier of the smart device and the second request to the cloud server, the operation further comprises:
detecting whether service feedback from the cloud server is received within a preset time length after the second request is sent;
displaying a prompt message of re-wakeup to the user when the service feedback from the cloud server is not received within the preset time length;
receiving the predefined wakeup phrase input by the user through voice to re-wake up the smart device.

12. A cloud server, wherein the cloud server comprises:
one or more processors;
a memory for storing one or more programs;
when said one or more programs are executed by said one or more processors, said one or more processors are enabled to implement a method comprising the following operations:
after a smart device is woken up by a predefined wakeup phrase and has entered a voice recognition phase, receiving an identifier of the smart device and a first request sent by the smart device during the voice recognition phase, wherein the first request is input by the user and received by the smart device;
obtaining the predefined wakeup phrase of the smart device according to the identifier of the smart device;
performing voice recognition on the first request to obtain the first request in a text form;
determining whether a number of words of the first request in the text form is equal to a number of words of the predefined wakeup phrase;
if the number of words of the first request in the text form is equal to the number of words of the predefined wakeup phrase, judging whether the first request in the text form consists of the predefined wakeup;

determining that the received first request is used to re-wake up the smart device when the first request in the text form consists of the predefined wakeup phrase, wherein the method further comprises:

before receiving the first request, during the voice recognition phase, receiving the identifier of the smart device and a second request including a voice command from the smart device, wherein the second request is input by the user and received by the smart device, and performing service satisfaction processing corresponding to the second request; and after determining that the received first request is used to re-wake up the smart device, stopping service satisfaction processing corresponding to the second request, to receive upcoming voice command.

13. A non-transitory computer-readable medium on which a computer program is stored, wherein the program, when executed by the processor, performs a method comprising the following operations:

receiving speech input consisting of one predefined wakeup phrase from a user, wherein the predefined wakeup phrase wakes up a smart device into a voice recognition phase;

receiving a first request input by the user in a voice manner during the voice recognition phase after the smart device is woken up by the predefined wakeup phrase and has entered the voice recognition phase;

performing voice recognition on the first request to obtain the first request in a text form;

determining whether a number of words of the first request in the text form is equal to a number of words of the predefined wakeup phrase;

if the number of words of the first request in the text form is equal to the number of words of the predefined wakeup phrase, then sending an identifier of the smart device and the first sequence in the text form to a cloud server so that the cloud server obtains the predefined wakeup phrase of the smart device according to the identifier of the smart device, and judges whether the first request in the text form consists of the predefined wakeup phrase;

determining that the first request is used to re-wake up the smart device when the first request in the text form consists of the predefined wakeup phrase, wherein the method further comprises:

before receiving the first request, receiving, during the voice recognition phase, a second request including a voice command from the user, and performing service satisfaction processing corresponding to the second request; and after determining that the received first request is used to re-wake up the smart device, stopping service satisfaction processing corresponding to the second request, to receive upcoming voice command.

14. The non-transitory computer-readable medium according to claim 13, wherein performing service satisfaction processing corresponding to the second request comprises:

querying in a local service information library to find service corresponding to the second request, and performing service satisfaction processing corresponding to the second request on the smart device.

15. The non-transitory computer-readable medium according to claim 13, wherein performing service satisfaction processing corresponding to the second request comprises:

sending the identifier of the smart device and the second request to the cloud server to enable the cloud server to begin to perform the service satisfaction processing corresponding to the second request on the smart device, and wherein after determining that the received first request is used to re-wake up the smart device, the operation further comprises:

sending the cloud server a re-wakeup notification message carrying the identifier of the smart device so that the cloud server, according to the identifier of the smart device, determines the corresponding smart device re-wakeup, and stopping service satisfaction processing corresponding to the second request.

16. The non-transitory computer-readable medium according to claim 15, wherein after receiving the second request input by the user in a voice manner and before sending the cloud server the second request carrying the identifier of the smart device, the method further comprises:

failing to find service corresponding to the second request by querying a local service information library of the smart device.

17. The non-transitory computer-readable medium according to claim 15, wherein after sending the identifier of the smart device and the second request to the cloud server, the method further comprises:

obtaining a time difference between current time and time of sending the second request to the cloud server;

displaying the time difference to the user until a feedback about the service corresponding to the second request sent by the cloud server is received, and cancelling the display after the feedback is received;

receiving the predefined wakeup phrase input by the user through voice to re-wake up the smart device; the predefined wakeup phrase are sent by the user upon determining that the time difference is larger than a preset time length according to the displayed time difference;

or, after sending the identifier of the smart device and the second request to the cloud server, the operation further comprises:

detecting whether service feedback from the cloud server is received within a preset time length after the second request is sent;

displaying a prompt message of re-wakeup to the user when the service feedback from the cloud server is not received within the preset time length;

receiving the predefined wakeup phrase input by the user through voice to re-wake up the smart device.

18. A non-transitory computer-readable medium on which a computer program is stored, wherein the program, when executed by the processor, performs the following operation:

after a smart device is woken up by a predefined wakeup phrase and has entered a voice recognition phase, receiving an identifier of the smart device and a first request sent by the smart device during the voice recognition phase, wherein the first request is input by the user and received by the smart device;

obtaining the predefined wakeup phrase of the smart device according to the identifier of the smart device;

performing voice recognition on the first request to obtain the first request in a text form;

determining whether a number of words of the first request in the text form is equal to a number of words of the predefined wakeup phrase;

if the number of words of the first request in the text form is equal to the number of words of the predefined wakeup phrase, judging whether the first request in the text form consists fo the predefined wakeup phrase;

determining that the received first request is used to re-wake up the smart device when the first request in the text form consists of the predefined wakeup phrase, wherein the method further comprises:

before receiving the first request, during the voice recognition phase, receiving the identifier of the smart device and a second request including a voice command from the smart device, wherein the second request is input by the user and received by the smart device, and performing service satisfaction processing corresponding to the second request; and after determining that the received first request is used to re-wake up the smart device, stopping service satisfaction processing corresponding to the second request, to receive upcoming voice command.

* * * * *